UNITED STATES PATENT OFFICE.

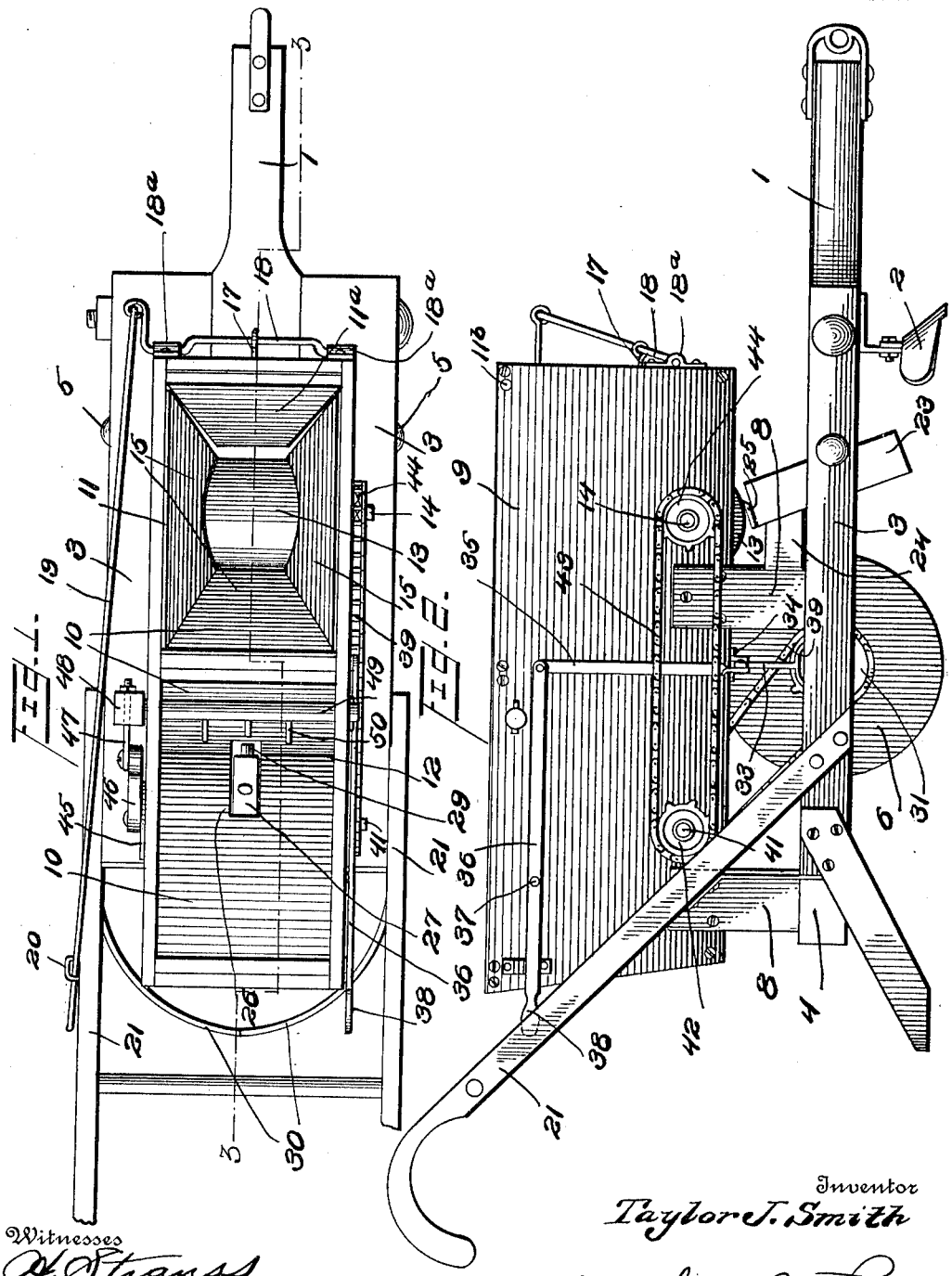

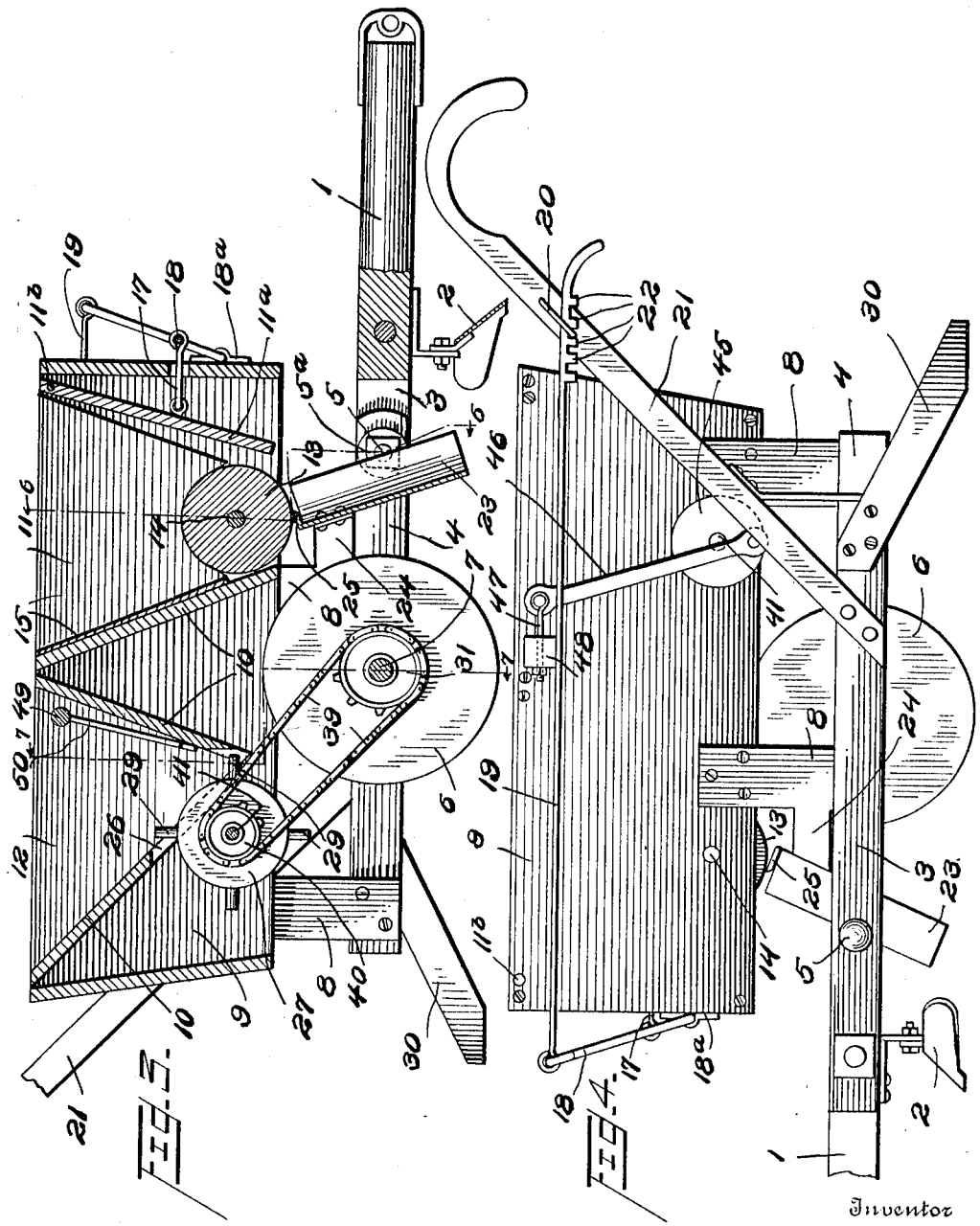

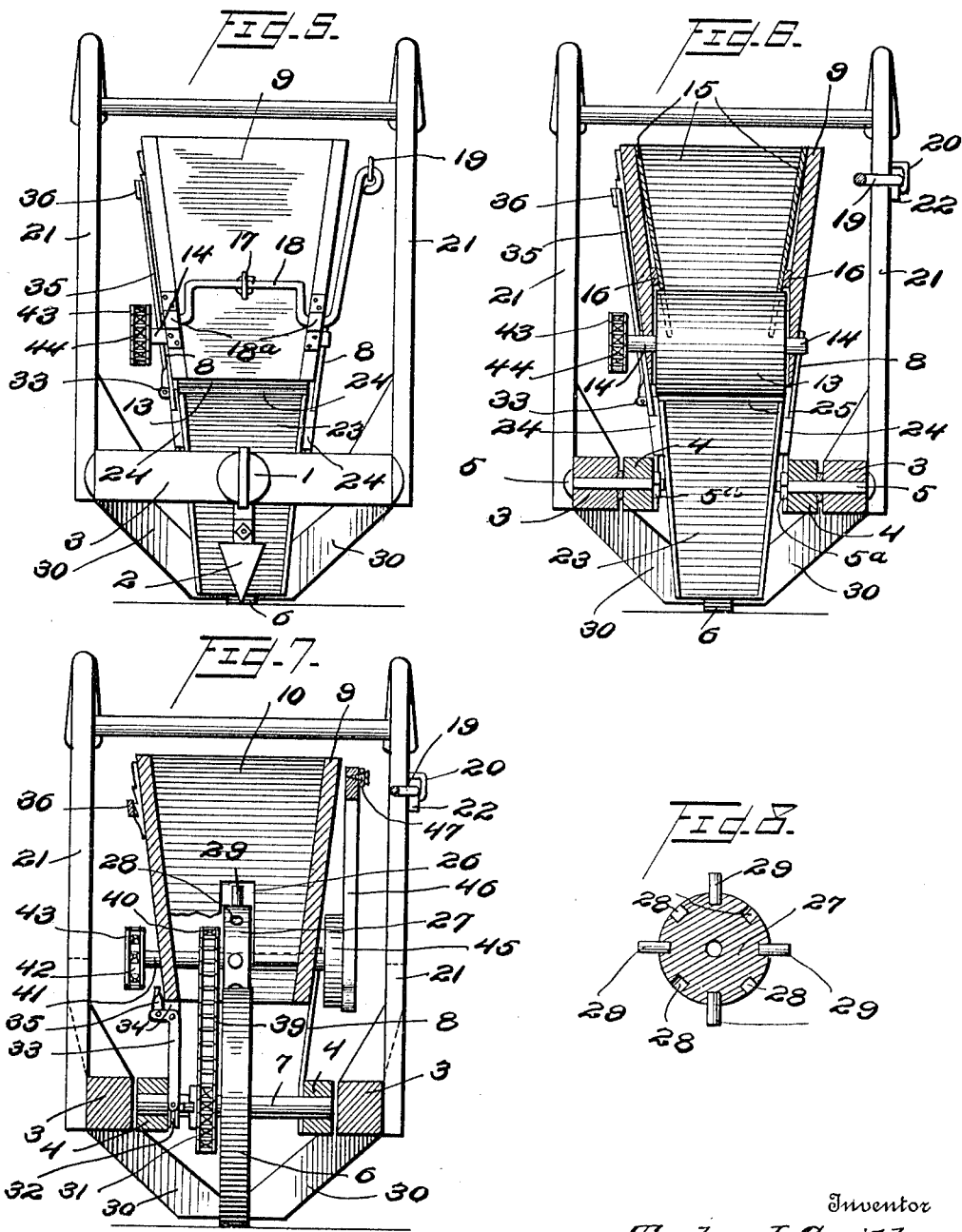

TAYLOR J. SMITH, OF UNION CITY, GEORGIA.

COMBINED FERTILIZER-DISTRIBUTER AND PLANTER.

1,066,858.  Specification of Letters Patent.  Patented July 8, 1913.

Application filed June 24, 1912. Serial No. 705,377.

*To all whom it may concern:*

Be it known that I, TAYLOR J. SMITH, a citizen of the United States, residing at Union City, in the county of Campbell and State of Georgia, have invented certain new and useful Improvements in Combined Fertilizer-Distributers and Planters, of which the following is a specification.

My invention relates to improvements in combined fertilizer distributers and planters, more particularly adapted for use in connection with the planting of cotton seed, although I do not limit myself to any such use, the object of the invention being to provide positive means for feeding or dropping guano or other fertilizer regardless of the condition of the same.

A further object is to provide an improved apparatus of this kind which when utilized in connection with a furrow opener or plow, is supported entirely independent of the plow, so that the weight of the apparatus has no effect upon the furrow opener, but allows the depth of the furrow to be controlled independent of the distributer and planter.

A further object is to provide a fertilizer distributer and planter which is pivotally connected to the beam of a plow or furrow opener and supported upon a wheel mounted to run in the furrow, so that the weight of the distributer and planter will be supported by the wheel and not transmitted to the furrow opener.

A further object is to provide a fertilizer distributer with a roller mounted in the hopper-like bottom of the fertilizer compartment, and positively forcing the fertilizer through an opening in the bottom, the size of which is controlled by a movable gate.

With these and other objects in view, the invention consists in certain novel features of construction and combinations and arrangements of parts, as will be more fully hereinafter described and pointed out in the claims.

In the accompanying drawings: Figure 1 is a top plan view illustrating my improvements. Fig. 2 is a view in side elevation. Fig. 3 is a view in longitudinal section on the line 3—3 of Fig. 1. Fig. 4 is a view in side elevation opposite to Fig. 2. Fig. 5 is a front end view. Fig. 6 is a view in section on the line 6—6 of Fig. 3. Fig. 7 is a view in section on the line 7—7 of Fig. 3 showing a portion of the seed hopper broken away to illustrate parts behind the same, and Fig. 8, is a view in section through the cotton seed feeding disk 27.

1 represents a beam to which any suitable draft animal is to be attached. This beam carries a plow or furrow opener 2, and the rear end of beam 1 is made fork shape as shown at 3, and in this fork shaped rear end of the beam, a frame 4 is pivotally connected by bolts 5 and nuts 5ª. The frame 4 is supported by a wheel 6 secured upon a rotary axle 7 having bearings in the frame 4. Uprights 8 are secured to frame 4 and support a box 9 which is of greater length than breadth, and is provided with transverse partitions 10 forming a front fertilizer hopper 11 and a rear seed hopper 12. The front hopper 11 is designed primarily for use as a distributer for guano or other powdered fertilizer, and the rear hopper 12 for cotton seed and will be described in connection with this particular use, although not limited to the same.

In the lower open end of the front hopper 11, a transversely positioned distributing roller 13 is secured upon a shaft 14, and metal plates 15 are secured to the three sides of this hopper and serve to direct the fertilizer onto the roll, the side plates 15 extended inward slightly and are recessed in their lower ends to prevent any possibility of the fertilizer getting between the end of the roll and the box which is illustrated most clearly in Fig. 6. These plates 15 are held at an incline by means of strips or blocks 16, and their smooth surface prevents the fertilizer from sticking to the hopper. A pivoted gate 11ª constitutes the front wall of the hopper 11, and is pivotally connected at its upper end as shown at 11ᵇ. By moving this gate 11ª, the size of the outlet from hopper 11 is adjusted. This gate 11ª is connected by link 17 with a crank shaft 18 supported in bearings 18ª on the front end of box 9. The movement of crank shaft 18 is controlled by a rod 19 which extends through a metal loop 20 fixed to one of the handles 21. These handles 21 are secured to the forked rear end 3 of beam 1, and are adapted to be grasped by the operator to guide the machine along the ground. Rod 19 is provided with a series of teeth 22 between any of which the metal loop 20 may be caught, and by this means the gate 11ª may be held at various positions of adjustment.

Below the roller 13, a channel chute 23 is provided and is secured to arms 24 on front uprights 8. The upper end of this chute 23 is provided with a scraper 25 which engages the under face of roller 13 so as to thoroughly scrape any fertilizer which may stick to the roll from the surface thereof, and compel it to fall down the chute to the ground. This channel chute is of great advantage, particularly upon a windy day, as it guides the fertilizer into the furrow and prevents it from being scattered broadcast. It is, however, of approximately the same width as the roller 13, so that the fertilizer is distributed in a relatively wide path, so that all the seed which drops will receive its quota of fertilizer and not only such seed which fall in the center of the furrow, which is the case with the distributers having a small tube to feed the fertilizer.

The cotton seed hopper 12 is provided in its bottom with a slot 26 through which a feeding disk 27 projects. This disk 27 is provided in its periphery with openings 28 to receive radially positioned pins 29, and as many of these pins 29 may be provided as deemed proper to feed the necessary quantity of seed into the furrow. These pins serve to force the seed out of the hopper, regardless of the retarding influence of the lint, so that there will be a uniform dropping action of the seed as the machine moves over the ground.

Scrapers or coverers 30 are secured to the rear end 3 of the beam, and are adapted to scrape the dirt into the furrow over the seed and fertilizer.

The wheel 6 not only operates as a means for supporting the box 9, but also acts as a power transmitting means. It is fixed to the shaft 7, and on this shaft 7 a sprocket wheel 31 is mounted to turn. This sprocket wheel is locked to the shaft 7 by means of a clutch 32, and said clutch is thrown by an L-shaped lever 33 fulcrumed at its angle in a bracket 34 secured to the bottom of the box 9. The short arm of this lever 33 is connected by a link 35 with a lever 36. Lever 36 is fulcrumed between its ends on a pin 37, and at its rear free end is formed with a hand hold 38 in convenient reach of the operator. By moving this lever 38, the clutch may be thrown into and out of locked relation to sprocket wheel 31. This is desirable because when moving the machine from place to place, or in turning at the end of a furrow, it is desirable to stop the distributing and feeding operations. Sprocket wheel 31 is connected by a chain 39 with a sprocket wheel 40 on a shaft 41, and to this shaft 41, the disk 27 above referred to is secured. The shaft 41 projects beyond both sides of the box, and on one side is provided with a sprocket wheel 42 which is connected by a sprocket chain 43 with a sprocket wheel 44 on shaft 14, so that motion is transmitted to the roller 13. On the shaft 41, at the opposite side of the box, a crank disk 45 is secured and is connected by a link 46 with a crank arm 47 secured to a block 48 on the end of a shaft 49. This shaft is provided with a plurality of fingers 50 which operate as beaters to beat down the cotton seed in hopper 12. The crank disk 45 gives to the link 46 just sufficient throw to oscillate the beater, so that the latter serves to maintain the cotton seed in proper condition for planting and insure its regular presentation to the fingers 29 as the disk 27 revolves. It will therefore be noted that as the machine moves over the ground, the entire weight of box 9 is supported on the wheel 6, and the operator may control the depth of the plow without regard to the weight of box 9. Furthermore, the roller 13 receives a positive rotary movement, so that it carries the fertilizer out through the bottom of the hopper regardless of whether or not the fertilizer is damp or dry. Of course the position of gate 11$^a$ will be adjusted in accordance with the condition and character of the fertilizer, and even though the fertilizer be damp, it will be forced out through the bottom of the hopper, and will be scraped from the roller by means of scraper 25. It will then fall down the chute 23 into the furrow in advance of the seed. The seed will be uniformly forced through the bottom of the hopper by means of the pins 29 and the coverers 30 will draw the soil over the fertilizer and seed. When the end of the row is reached, the operator moves lever 36 to throw clutch 32, so that the distributing and seed dropping operation is stopped, while the machine is turning and by throwing the lever 36 in the opposite direction, the clutch 32 will be thrown into engagement with sprocket wheel 31 and the distributing and dropping operation continued.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a beam having a forked rear end and a furrow opener secured to the beam in advance of the forked rear end, of a frame located within the forked rear end and pivotally connected at the forward end of the frame and at both sides thereof to the inner faces of the members of the forked end of the beam, a wheel supporting the frame, and a fertilizer distributer on said frame, substantially as described.

2. The combination with a beam having a forked rear end and a furrow opener secured to the beam in advance of the forked rear end, of a frame located within the forked rear end and pivotally connected at the forward end of the frame and at both sides thereof to the inner faces of the members of the forked end of the beam, a wheel supporting the frame, a box supported on said frame, partitions in said box forming a front and rear hopper, the former adapted to contain fertilizer and the latter seed, and means for controlling the outlet of both hoppers, substantially as described.

3. The combination with a beam having a forked rear end and a furrow opener secured to the beam in advance of the forked rear end, of a frame located within the forked rear end and pivotally connected at the forward end of the frame and at both sides thereof to the inner faces of the members of the forked end of the beam, a wheel supporting the frame, a hopper supported on the frame and adapted to contain fertilizer, a roller mounted in the lower open end of the hopper, and means for transmitting motion from said wheel to the roller, substantially as described.

4. The combination with a beam having a forked rear end and a furrow opener secured to the beam in advance of the forked rear end, of a frame located within the forked rear end and pivotally connected at its forward end and at both sides thereof to the inner faces of the members of the forked end of the beam, a shaft in the intermediate portion of the frame, a wheel on said shaft supporting the frame, a box supported by the frame above the wheel, and a fertilizer distributer in said box, substantially as described.

5. The combination with a beam having a forked rear end and a furrow opener secured to the beam in advance of the forked rear end, of a frame located within the forked rear end and pivotally connected at its forward end and at both sides thereof to the inner faces of the members of the forked end of the beam, a shaft in the intermediate portion of the frame, a wheel on said shaft supporting the frame, a box supported by the frame above the wheel, a fertilizer distributer in the box discharging in advance of the wheel, and a seed dropper in said box discharging in rear of the wheel, substantially as described.

6. The combination with a beam, a furrow opener secured to the beam, of a frame pivotally connected to the beam, a roller supporting the frame, a hopper supported on the frame and adapted to contain fertilizer, a roller mounted in the lower open end of the hopper, a pivoted gate located within the hopper and in front of the roller, said gate movable toward and away from the roller controlling the outlet of the hopper, plates in the hopper projecting over the ends of the roller, means for moving and holding the gate at various positions of adjustment, and means for transmitting motion from the wheel to the roller, substantially as described.

7. The combination with a beam, and a furrow opener secured to the beam, of a frame pivotally connected to the beam, a roller supporting the frame, a hopper supported on the frame and adapted to contain fertilizer, a roller mounted in the lower open end of the hopper, means for transmitting motion from said wheel to the roller, a pivoted gate located within the hopper and in front of the roller, said gate movable toward and away from the roller controlling the outlet from the hopper, a chute located below the roller and of approximately the same width as the exposed length of the roller, and a scraper engaging the under face of said roller, whereby the fertilizer is scraped therefrom into the chute, substantially as described.

8. The combination with a beam, and a furrow opener secured to the beam, of a frame pivotally connected to the beam, a roller supporting the frame, a hopper supported on the frame and adapted to contain fertilizer, a roller mounted in the lower open end of the hopper, a pivoted gate located within the hopper and in front of the roller, said gate movable toward and away from the roller controlling the outlet of the hopper, plates in the hopper projecting over the ends of the roller, means for moving and holding the gate at various positions of adjustment, means for transmitting motion from the wheel to the roller, a chute located below the roller and of approximately the same width as the exposed length of the roller, and a scraper engaging the under face of said roller, whereby the fertilizer is scraped therefrom into the chute, substantially as described.

In testimony whereof I have signed my name to this specification in the presence of two subscribing witnesses.

TAYLOR J. SMITH.

Witnesses:
R. E. L. EVANS,
W. E. MORELAND.

---

Copies of this patent may be obtained for five cents each, by addressing the "Commissioner of Patents, Washington, D. C."